US012694387B2

(12) United States Patent
Raja Surya et al.

(10) Patent No.: US 12,694,387 B2
(45) Date of Patent: Jul. 28, 2026

(54) CONDUCTING A PAYMENT TRANSACTION VIA A BLOCKCHAIN REGISTERED CONTAINER AT POINT OF SALE

(71) Applicant: Toshiba Global Commerce Solutions, Inc., Durham, NC (US)

(72) Inventors: Sarath Babu Raja Surya, Raleigh, NC (US); Benjamin Duan-Porter, Eden Prairie, MN (US); Phillip Monkowski, Apex, NC (US); Ping-Cherng Lin, Durham, NC (US); John Wendler, Raleigh, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 386 days.

(21) Appl. No.: 18/112,685

(22) Filed: Feb. 22, 2023

(65) Prior Publication Data

US 2024/0281789 A1     Aug. 22, 2024

(51) Int. Cl.
| | |
|---|---|
| *G06Q 20/20* | (2012.01) |
| *G06Q 20/32* | (2012.01) |
| *G06Q 20/38* | (2012.01) |

(52) U.S. Cl.
CPC ......... *G06Q 20/208* (2013.01); *G06Q 20/325* (2013.01); *G06Q 20/389* (2013.01)

(58) Field of Classification Search
CPC .. G06Q 20/208; G06Q 20/325; G06Q 20/389; G06Q 20/36; G06Q 20/065;

(Continued)

(56) References Cited

U.S. PATENT DOCUMENTS

| | | | |
|---|---|---|---|
| 8,564,621 B2 | 10/2013 | Branson | |
| 10,769,700 B2 | 9/2020 | Hamilton | |

(Continued)

OTHER PUBLICATIONS

Thakur Prerana, Smart Shopping Cart for Automatic Billing in Supermarket, 2017, International Journal of Engineering Development and Research, vol. 5, Issue 2, pp. 975-979 (Year: 2017).*

(Continued)

*Primary Examiner* — Aaron Tutor
(74) *Attorney, Agent, or Firm* — Kaufman & Canoles, P.C.

(57)     ABSTRACT

Systems and methods of conducting a payment transaction via a blockchain registered container at a point of sale are presented. In one exemplary embodiment, a method is performed by a POS system having a sensing device operable to sense an identifier specific to a container configured to transport items after checkout. The POS system is communicatively coupled to a blockchain network that includes network nodes that are collectively configured to operate a blockchain. The container identifier is specific to a cryptographic digital asset stored on the blockchain as a container identifier code. Further, the cryptographic digital asset includes a code that represents an electronic payment instrument identifier configured to enable an electronic payment transaction based on the container identifier sensed from the container. The method includes sending, to the blockchain, a request for block data associated with the cryptographic digital asset based on the container identifier.

21 Claims, 8 Drawing Sheets

(58) Field of Classification Search
CPC ... G06Q 30/0226; H04L 2209/56; H04L 9/50;
G07G 1/0036; G07G 1/0045
See application file for complete search history.

(56) References Cited

U.S. PATENT DOCUMENTS

| | | | |
|---|---|---|---|
| 11,004,101 | B2 | 5/2021 | Balfour |
| 11,403,630 | B2 | 8/2022 | Dua |
| 2011/0145706 | A1 | 6/2011 | Wilson |
| 2014/0274313 | A1 | 9/2014 | Bala |
| 2019/0279204 | A1 | 9/2019 | Norton |
| 2020/0134656 | A1 | 4/2020 | Padmanabhan |
| 2021/0004858 | A1 | 1/2021 | Arora |
| 2021/0256070 | A1 | 8/2021 | Tran |
| 2021/0383461 | A1 | 12/2021 | Andon |
| 2022/0173893 | A1 | 6/2022 | Basu |
| 2022/0188839 | A1 | 6/2022 | Andon |
| 2022/0207119 | A1 | 6/2022 | Andon |

| | | | | |
|---|---|---|---|---|
| 2023/0230065 | A1* | 7/2023 | Yan | G06Q 20/36 |
| | | | | 705/41 |
| 2023/0289715 | A1* | 9/2023 | Schnitzer | G06Q 10/30 |
| 2024/0119512 | A1* | 4/2024 | Musiani | G06V 20/52 |

OTHER PUBLICATIONS

D. Mohl, NFTs Explained Quick: From Zero to Hero, Apr. 18, 2022, Mercari Engineering (available at https:/engineering.mercari.com/en/blog/entry/20220414-nfts-explained-quick-from-zero-to-hero/).
H. Christian, Blockchain Technology Can End a Multimillion Dollar Financial Fraud, Mar. 28, 2022, TotalRetail (available at https://www.mytotalretail.com/article/blockchain-technology-can-end-a-multimillion-dollar-financial-fraud/).
J. Mehta, D. Mehta, J. Jain and S. Dholay "Asset Tracking System Using Blockchain," 2021 Asian Conference on Innovation in Technology (ASIANCON), Pune, India, 2021, pp. 1-7, doi: 10.1109/ASIANCON51346.2021.9544543.

* cited by examiner

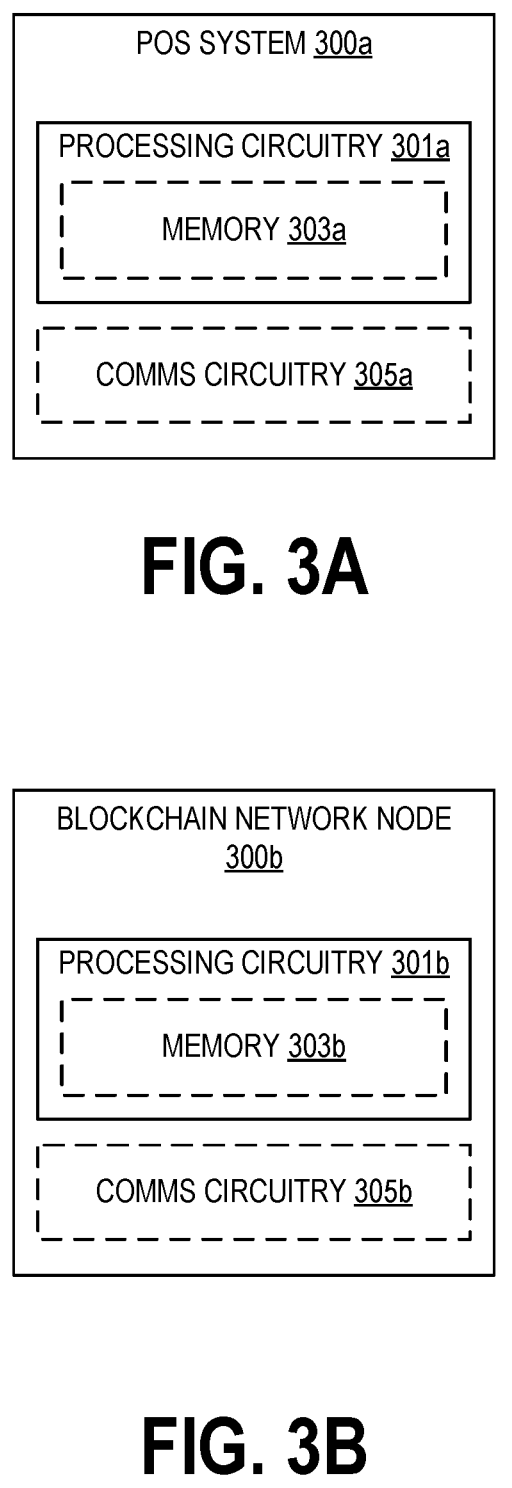

POS SYSTEM 300a

PROCESSING CIRCUITRY 301a

MEMORY 303a

COMMS CIRCUITRY 305a

FIG. 3A

BLOCKCHAIN NETWORK NODE
300b

PROCESSING CIRCUITRY 301b

MEMORY 303b

COMMS CIRCUITRY 305b

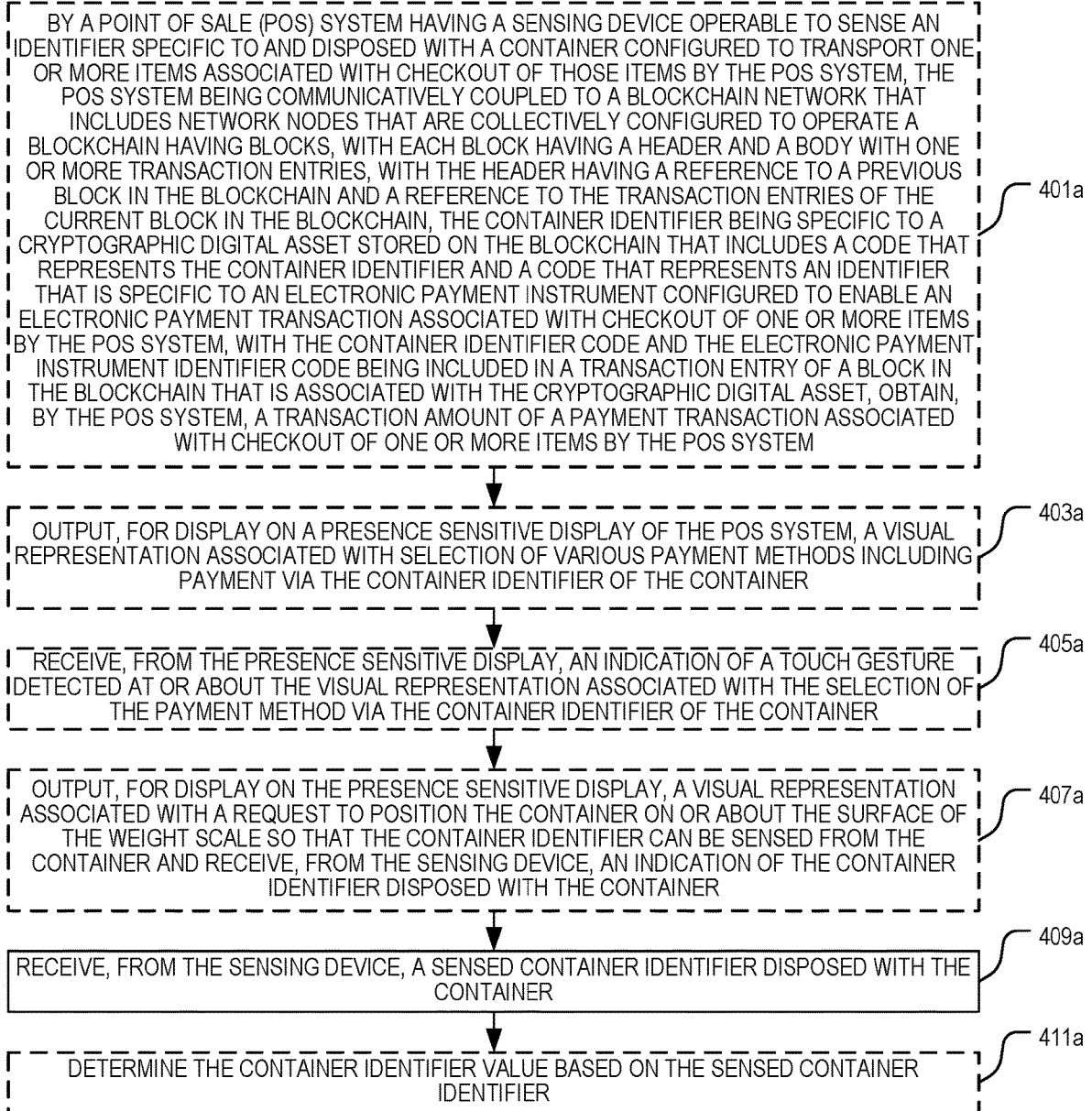

BY A POINT OF SALE (POS) SYSTEM HAVING A SENSING DEVICE OPERABLE TO SENSE AN IDENTIFIER SPECIFIC TO AND DISPOSED WITH A CONTAINER CONFIGURED TO TRANSPORT ONE OR MORE ITEMS ASSOCIATED WITH CHECKOUT OF THOSE ITEMS BY THE POS SYSTEM, THE POS SYSTEM BEING COMMUNICATIVELY COUPLED TO A BLOCKCHAIN NETWORK THAT INCLUDES NETWORK NODES THAT ARE COLLECTIVELY CONFIGURED TO OPERATE A BLOCKCHAIN HAVING BLOCKS, WITH EACH BLOCK HAVING A HEADER AND A BODY WITH ONE OR MORE TRANSACTION ENTRIES, WITH THE HEADER HAVING A REFERENCE TO A PREVIOUS BLOCK IN THE BLOCKCHAIN AND A REFERENCE TO THE TRANSACTION ENTRIES OF THE CURRENT BLOCK IN THE BLOCKCHAIN, THE CONTAINER IDENTIFIER BEING SPECIFIC TO A CRYPTOGRAPHIC DIGITAL ASSET STORED ON THE BLOCKCHAIN THAT INCLUDES A CODE THAT REPRESENTS THE CONTAINER IDENTIFIER AND A CODE THAT REPRESENTS AN IDENTIFIER THAT IS SPECIFIC TO AN ELECTRONIC PAYMENT INSTRUMENT CONFIGURED TO ENABLE AN ELECTRONIC PAYMENT TRANSACTION ASSOCIATED WITH CHECKOUT OF ONE OR MORE ITEMS BY THE POS SYSTEM, WITH THE CONTAINER IDENTIFIER CODE AND THE ELECTRONIC PAYMENT INSTRUMENT IDENTIFIER CODE BEING INCLUDED IN A TRANSACTION ENTRY OF A BLOCK IN THE BLOCKCHAIN THAT IS ASSOCIATED WITH THE CRYPTOGRAPHIC DIGITAL ASSET, OBTAIN, BY THE POS SYSTEM, A TRANSACTION AMOUNT OF A PAYMENT TRANSACTION ASSOCIATED WITH CHECKOUT OF ONE OR MORE ITEMS BY THE POS SYSTEM        401a

OUTPUT, FOR DISPLAY ON A PRESENCE SENSITIVE DISPLAY OF THE POS SYSTEM, A VISUAL REPRESENTATION ASSOCIATED WITH SELECTION OF VARIOUS PAYMENT METHODS INCLUDING PAYMENT VIA THE CONTAINER IDENTIFIER OF THE CONTAINER        403a

RECEIVE, FROM THE PRESENCE SENSITIVE DISPLAY, AN INDICATION OF A TOUCH GESTURE DETECTED AT OR ABOUT THE VISUAL REPRESENTATION ASSOCIATED WITH THE SELECTION OF THE PAYMENT METHOD VIA THE CONTAINER IDENTIFIER OF THE CONTAINER        405a

OUTPUT, FOR DISPLAY ON THE PRESENCE SENSITIVE DISPLAY, A VISUAL REPRESENTATION ASSOCIATED WITH A REQUEST TO POSITION THE CONTAINER ON OR ABOUT THE SURFACE OF THE WEIGHT SCALE SO THAT THE CONTAINER IDENTIFIER CAN BE SENSED FROM THE CONTAINER AND RECEIVE, FROM THE SENSING DEVICE, AN INDICATION OF THE CONTAINER IDENTIFIER DISPOSED WITH THE CONTAINER        407a

RECEIVE, FROM THE SENSING DEVICE, A SENSED CONTAINER IDENTIFIER DISPOSED WITH THE CONTAINER        409a

DETERMINE THE CONTAINER IDENTIFIER VALUE BASED ON THE SENSED CONTAINER IDENTIFIER        411a

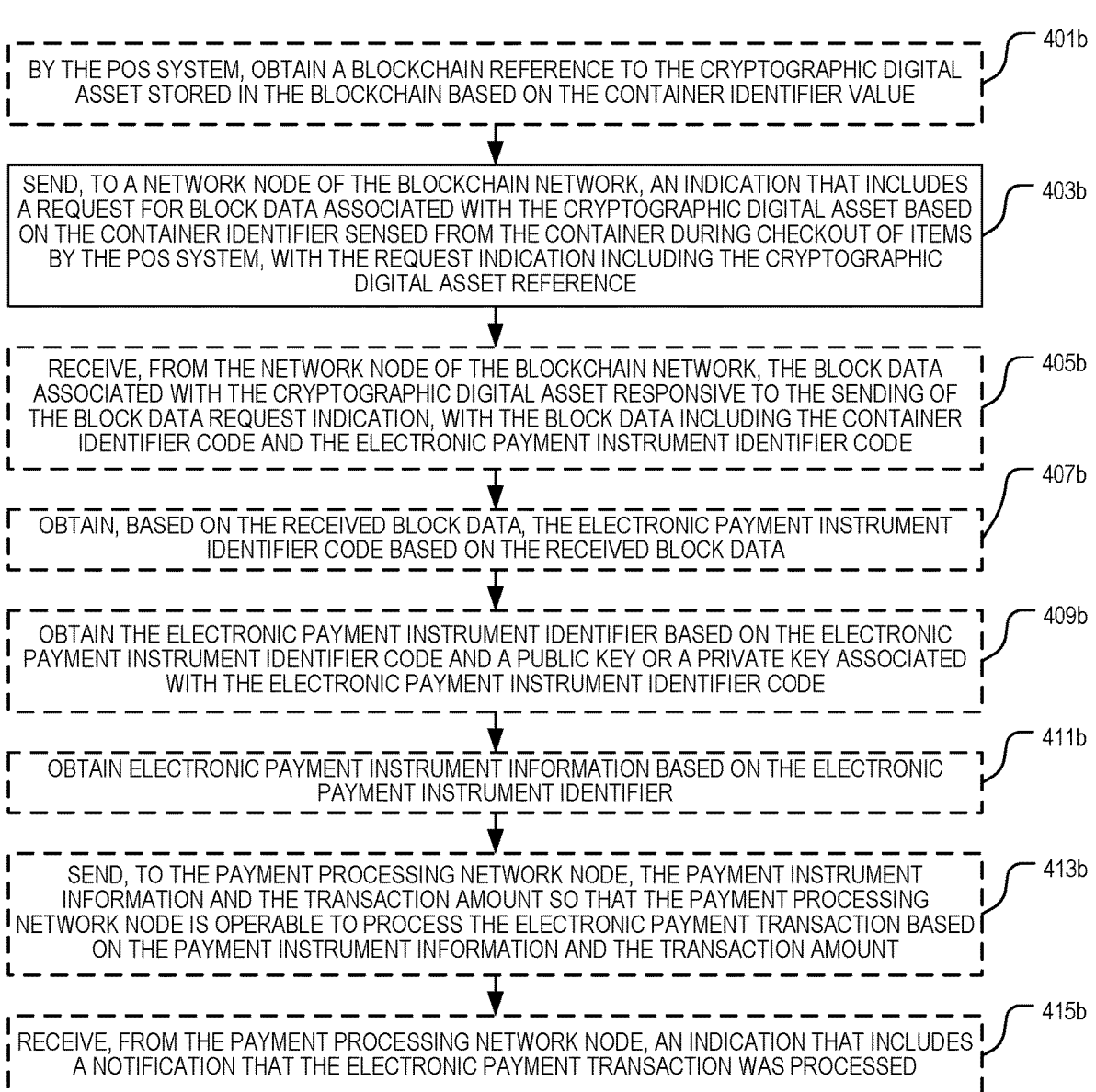

BY THE POS SYSTEM, OBTAIN A BLOCKCHAIN REFERENCE TO THE CRYPTOGRAPHIC DIGITAL ASSET STORED IN THE BLOCKCHAIN BASED ON THE CONTAINER IDENTIFIER VALUE — 401b

SEND, TO A NETWORK NODE OF THE BLOCKCHAIN NETWORK, AN INDICATION THAT INCLUDES A REQUEST FOR BLOCK DATA ASSOCIATED WITH THE CRYPTOGRAPHIC DIGITAL ASSET BASED ON THE CONTAINER IDENTIFIER SENSED FROM THE CONTAINER DURING CHECKOUT OF ITEMS BY THE POS SYSTEM, WITH THE REQUEST INDICATION INCLUDING THE CRYPTOGRAPHIC DIGITAL ASSET REFERENCE — 403b

RECEIVE, FROM THE NETWORK NODE OF THE BLOCKCHAIN NETWORK, THE BLOCK DATA ASSOCIATED WITH THE CRYPTOGRAPHIC DIGITAL ASSET RESPONSIVE TO THE SENDING OF THE BLOCK DATA REQUEST INDICATION, WITH THE BLOCK DATA INCLUDING THE CONTAINER IDENTIFIER CODE AND THE ELECTRONIC PAYMENT INSTRUMENT IDENTIFIER CODE — 405b

OBTAIN, BASED ON THE RECEIVED BLOCK DATA, THE ELECTRONIC PAYMENT INSTRUMENT IDENTIFIER CODE BASED ON THE RECEIVED BLOCK DATA — 407b

OBTAIN THE ELECTRONIC PAYMENT INSTRUMENT IDENTIFIER BASED ON THE ELECTRONIC PAYMENT INSTRUMENT IDENTIFIER CODE AND A PUBLIC KEY OR A PRIVATE KEY ASSOCIATED WITH THE ELECTRONIC PAYMENT INSTRUMENT IDENTIFIER CODE — 409b

OBTAIN ELECTRONIC PAYMENT INSTRUMENT INFORMATION BASED ON THE ELECTRONIC PAYMENT INSTRUMENT IDENTIFIER — 411b

SEND, TO THE PAYMENT PROCESSING NETWORK NODE, THE PAYMENT INSTRUMENT INFORMATION AND THE TRANSACTION AMOUNT SO THAT THE PAYMENT PROCESSING NETWORK NODE IS OPERABLE TO PROCESS THE ELECTRONIC PAYMENT TRANSACTION BASED ON THE PAYMENT INSTRUMENT INFORMATION AND THE TRANSACTION AMOUNT — 413b

RECEIVE, FROM THE PAYMENT PROCESSING NETWORK NODE, AN INDICATION THAT INCLUDES A NOTIFICATION THAT THE ELECTRONIC PAYMENT TRANSACTION WAS PROCESSED — 415b

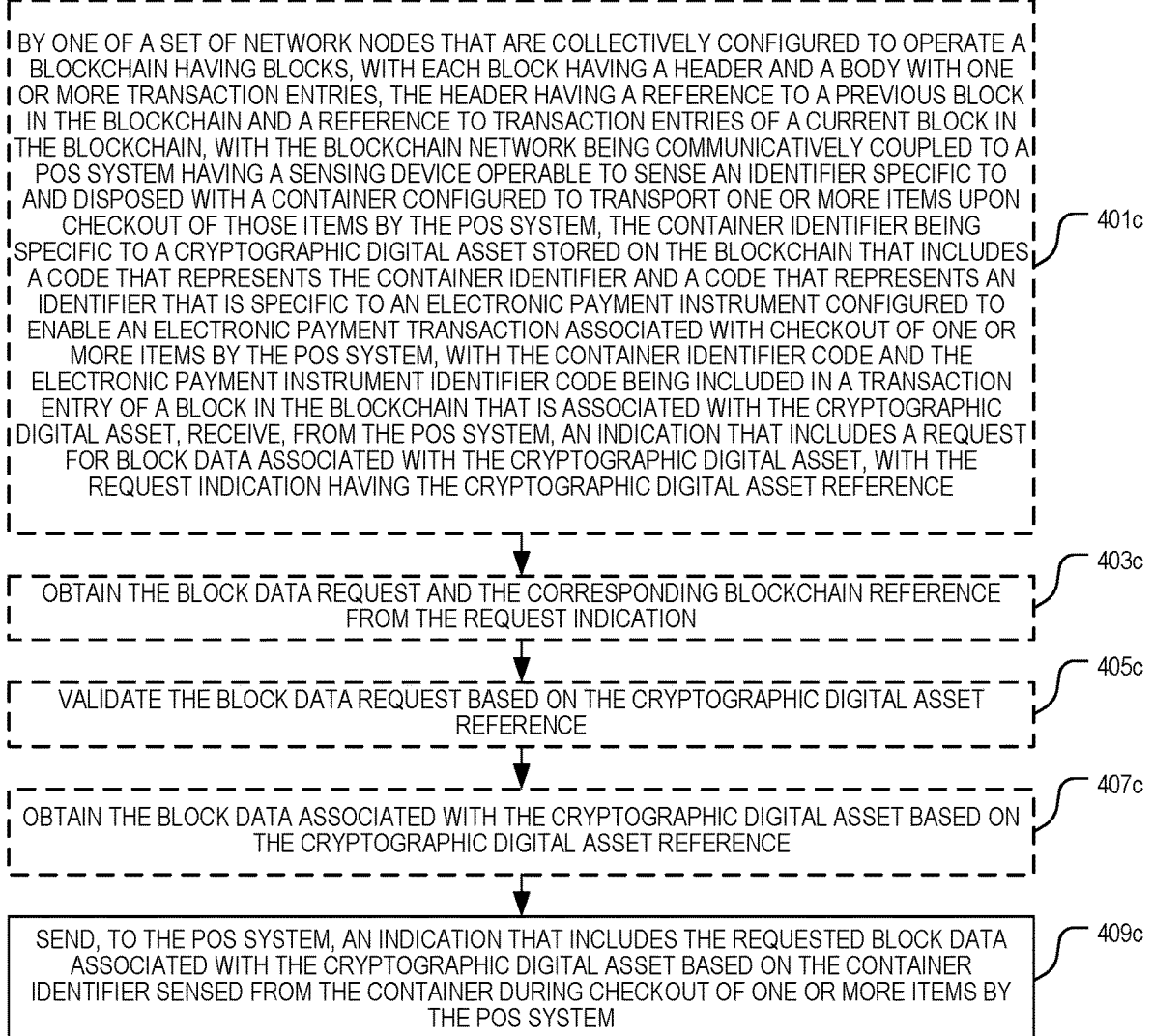

BY ONE OF A SET OF NETWORK NODES THAT ARE COLLECTIVELY CONFIGURED TO OPERATE A BLOCKCHAIN HAVING BLOCKS, WITH EACH BLOCK HAVING A HEADER AND A BODY WITH ONE OR MORE TRANSACTION ENTRIES, THE HEADER HAVING A REFERENCE TO A PREVIOUS BLOCK IN THE BLOCKCHAIN AND A REFERENCE TO TRANSACTION ENTRIES OF A CURRENT BLOCK IN THE BLOCKCHAIN, WITH THE BLOCKCHAIN NETWORK BEING COMMUNICATIVELY COUPLED TO A POS SYSTEM HAVING A SENSING DEVICE OPERABLE TO SENSE AN IDENTIFIER SPECIFIC TO AND DISPOSED WITH A CONTAINER CONFIGURED TO TRANSPORT ONE OR MORE ITEMS UPON CHECKOUT OF THOSE ITEMS BY THE POS SYSTEM, THE CONTAINER IDENTIFIER BEING SPECIFIC TO A CRYPTOGRAPHIC DIGITAL ASSET STORED ON THE BLOCKCHAIN THAT INCLUDES A CODE THAT REPRESENTS THE CONTAINER IDENTIFIER AND A CODE THAT REPRESENTS AN IDENTIFIER THAT IS SPECIFIC TO AN ELECTRONIC PAYMENT INSTRUMENT CONFIGURED TO ENABLE AN ELECTRONIC PAYMENT TRANSACTION ASSOCIATED WITH CHECKOUT OF ONE OR MORE ITEMS BY THE POS SYSTEM, WITH THE CONTAINER IDENTIFIER CODE AND THE ELECTRONIC PAYMENT INSTRUMENT IDENTIFIER CODE BEING INCLUDED IN A TRANSACTION ENTRY OF A BLOCK IN THE BLOCKCHAIN THAT IS ASSOCIATED WITH THE CRYPTOGRAPHIC DIGITAL ASSET, RECEIVE, FROM THE POS SYSTEM, AN INDICATION THAT INCLUDES A REQUEST FOR BLOCK DATA ASSOCIATED WITH THE CRYPTOGRAPHIC DIGITAL ASSET, WITH THE REQUEST INDICATION HAVING THE CRYPTOGRAPHIC DIGITAL ASSET REFERENCE

401c

OBTAIN THE BLOCK DATA REQUEST AND THE CORRESPONDING BLOCKCHAIN REFERENCE FROM THE REQUEST INDICATION

403c

VALIDATE THE BLOCK DATA REQUEST BASED ON THE CRYPTOGRAPHIC DIGITAL ASSET REFERENCE

405c

OBTAIN THE BLOCK DATA ASSOCIATED WITH THE CRYPTOGRAPHIC DIGITAL ASSET BASED ON THE CRYPTOGRAPHIC DIGITAL ASSET REFERENCE

407c

SEND, TO THE POS SYSTEM, AN INDICATION THAT INCLUDES THE REQUESTED BLOCK DATA ASSOCIATED WITH THE CRYPTOGRAPHIC DIGITAL ASSET BASED ON THE CONTAINER IDENTIFIER SENSED FROM THE CONTAINER DURING CHECKOUT OF ONE OR MORE ITEMS BY THE POS SYSTEM

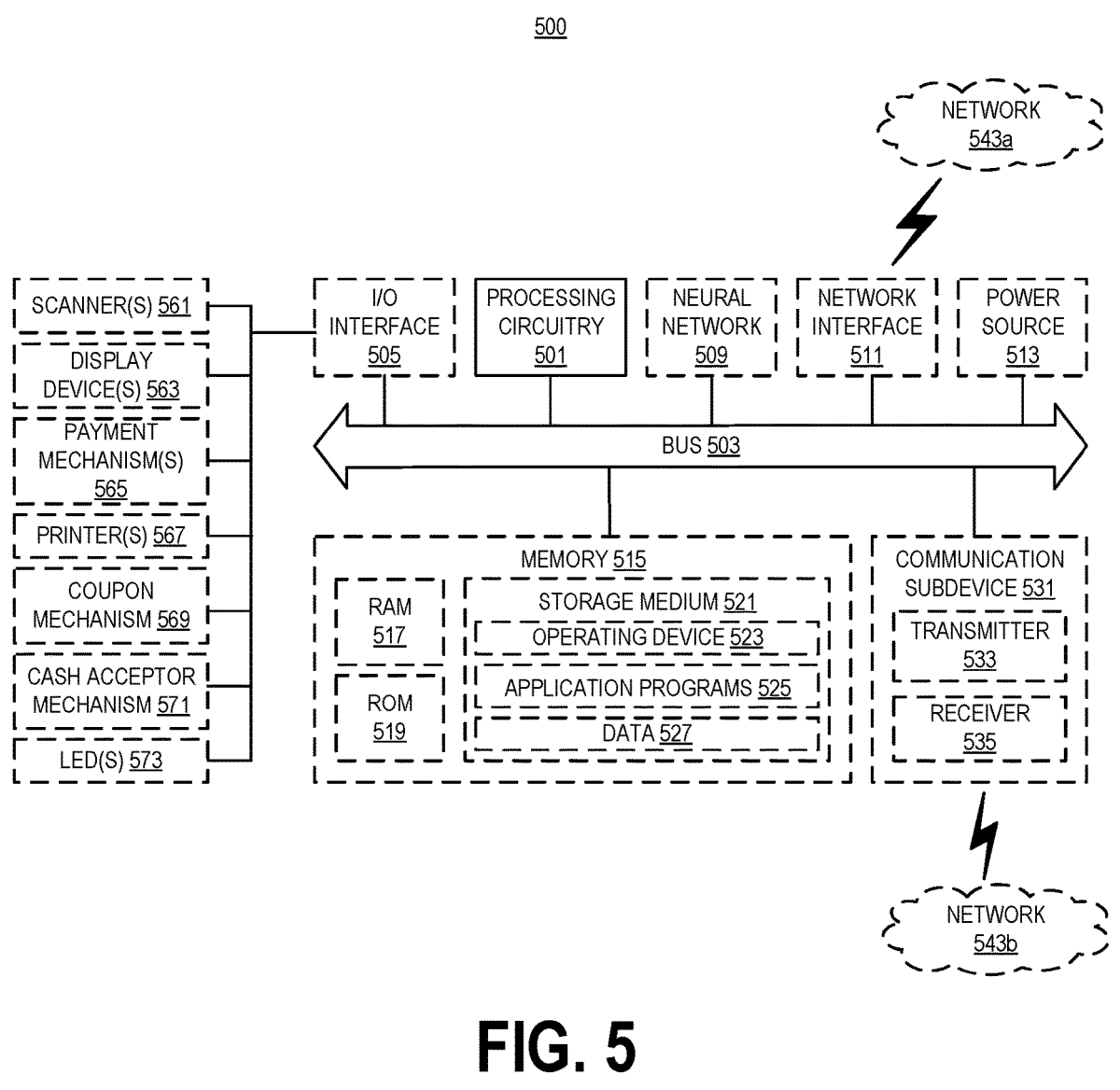

NETWORK
543a

SCANNER(S) 561

DISPLAY
DEVICE(S) 563

PAYMENT
MECHANISM(S)
565

PRINTER(S) 567

COUPON
MECHANISM 569

CASH ACCEPTOR
MECHANISM 571

LED(S) 573

I/O
INTERFACE
505

PROCESSING
CIRCUITRY
501

NEURAL
NETWORK
509

NETWORK
INTERFACE
511

POWER
SOURCE
513

BUS 503

MEMORY 515

RAM
517

ROM
519

STORAGE MEDIUM 521

OPERATING DEVICE 523

APPLICATION PROGRAMS 525

DATA 527

COMMUNICATION
SUBDEVICE 531

TRANSMITTER
533

RECEIVER
535

NETWORK
543b

FIG. 5

CONDUCTING A PAYMENT TRANSACTION VIA A BLOCKCHAIN REGISTERED CONTAINER AT POINT OF SALE

BACKGROUND

Retailers use point of sale hardware and software systems (POS systems) to streamline checkout operations and to allow retailers to process sales, handle payments, and store transactions for later retrieval. POS systems generally comprise a number of components including POS terminals and bagging stations. In a typical retail environment, there are multiple POS terminals in communication with a server over a network. POS systems typically enable customers to scan retail items, determine and indicate the amount owed for those items, prepare and present invoices, allow customers to make payments to retailers for those items, and enable customers or retail staff to bag those items. The POS terminals typically provide multiple payment options during checkout at the POS systems, with most payments being carried out using electronic payment systems in which the transaction is processed, validated, and mediated by a trusted third party such as a financial institution. The bagging stations typically enable customers or retail staff to bag purchased retail items in shopping bags during checkout at the POS systems. The shopping bags are typically single-use plastic bags made from various kinds of plastic, with many of these bags being improperly discarded and ending up as harmful plastic waste in the environment.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 3A illustrates another embodiment of a POS device in accordance with various aspects as described herein. FIG. 3B illustrates another embodiment of a network node of a blockchain network in accordance with various aspects as described herein.

FIGS. 4A-B illustrate embodiments of a method performed by a POS device of conducting a payment transaction via a blockchain registered container at point of sale in accordance with various aspects as described herein. FIG. 4C illustrates one embodiment of a method performed by a network node of a blockchain network of conducting a payment transaction via a blockchain registered container at point of sale in accordance with various aspects as described herein.

FIG. 5 illustrates another embodiment of a POS device in accordance with various aspects as described herein.

DETAILED DESCRIPTION

Figure 1:
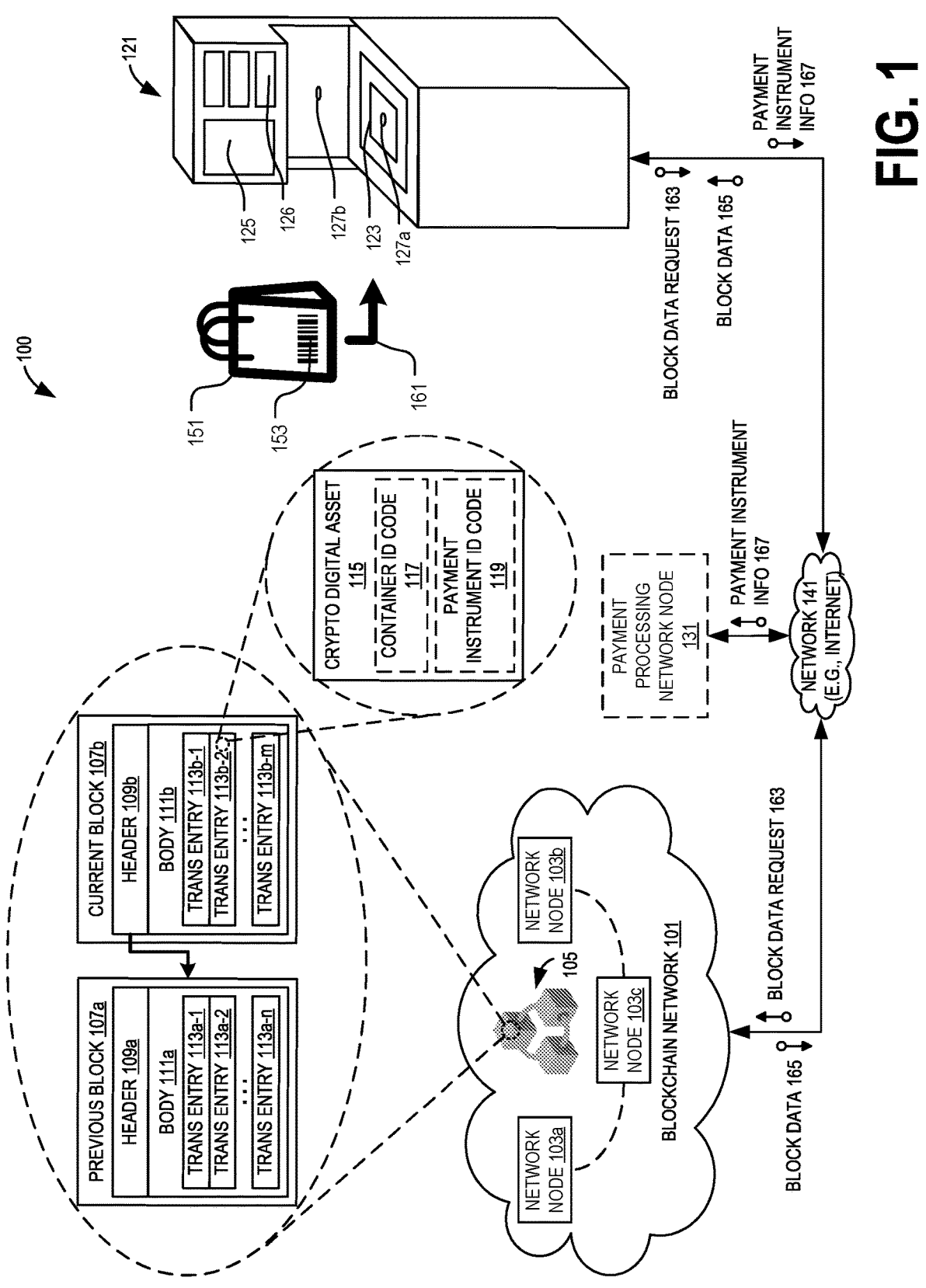
FIG. 1 illustrates one embodiment of a system of conducting a payment transaction via a blockchain registered container at point of sale in accordance with various aspects as described herein.

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

The use of reusable shopping bags, which can be made from fabric, natural fibers, woven synthetic fibers or the like, has become more mainstream due to increased societal awareness of the environmental harms associated with disposable plastic bags. Indeed, many retailers have encouraged the use of reusable shopping bags. However, most U.S. grocery store customers do not bring their own reusable bags, with many reusable bags going unused by customers. As such, shoppers' adoption of the use of reusable shopping bags has been slow, with little incentive for shoppers to use reusable shopping bags except for some nominal savings. Accordingly, there is a need for improved methods and techniques to facilitate an increase in the adoption of reusable shopping bags in the retail environment so as to reduce damage to the environment. In addition, other desirable features and characteristics of the present disclosure will become apparent from the subsequent detailed description and embodiments, taken in conjunction with the accompanying figures and the foregoing technical field and background.

A blockchain is an immutable public or private digital ledger, once a transaction is recorded it cannot be modified. A blockchain can also enable a shopping bag to be linked to a unique profile. By registering a reusable shopping bag as a payment method on a blockchain, a customer can use his or her reusable shopping bag to purchase retail items without requiring a card or cash payment. Instead, a payment for an electronic transaction can be performed using the shopper's tracked electronic payment instrument, which may be stored in a cryptocurrency wallet also tracked on the blockchain or other means. For instance, if a reusable shopping bag has a corresponding tracked electronic payment instrument, the bag can accumulate credit, which can be used to provide discounts or payment for goods or services associated with use of the bag. By registering a reusable shopping bag as a payment instrument on the blockchain, shoppers can purchase items without requiring the physical use of cash or a credit card during checkout. Instead, payment for a transaction can be performed by a shopper's tracked electronic payment instrument, which can be a cryptocurrency wallet also tracked on the blockchain, or by another means. For instance, if a reusable shopping bag is used, the bag itself could build credit, eventually providing discounts or payment for goods or services. Since blockchain is distributed, participants have a copy of the ledger for complete transparency. As such, retailers can obtain access to this distributed data to incentivize shoppers.

Furthermore, the exemplary embodiments described herein include improved techniques to conduct a payment transaction via a blockchain registered container at point of sale. For example, FIG. 1 illustrates one embodiment of a system 100 of conducting a payment transaction via a blockchain registered container at point of sale in accordance with various aspect as described herein. In FIG. 1, the system 100 includes a POS system or device 121 (e.g., self-checkout device, assisted checkout device, self-service checkout device, checkout device) coupled to a blockchain network 101 and a payment processing network node 131 (e.g., financial institution server) over a network 141 (e.g., Internet, intranet). The POS device 121 can include one or more sensing devices 127*a-b* (e.g., camera, bar code scanner, radio frequency identification (RFID) device, near field communication (NFC) device), a weight scale 123, the like, or any combination thereof. The POS device 121 can also include a user interface device 125, 126 (e.g., touchscreen display, LED, keypad, payment reader, printer, credit card reader), or the like. The weight scale 123 is operable to measure a weight of an item (e.g., produce) placed on the surface of the scale 123. The weight scale 123 can include an integrated sensing device 127*a* (e.g., scanner scale) that is operable to scan a quick response (QR) code, bar code positioned on an item that is moved over the window surface of the scale 123. The integrated sensing device 127*a* can include an RFID detector device that is operable to detect an RFID tag disposed with the container 151. Further, the integrated sensing device 127*a* can include a near field communication (NFC) device that is operable to communicate with an NFC device disposed with the container 151. Further, the POS device 121 can be operable to obtain the container identifier from the sensed container identifier captured by the sensing device 127*a,b*.

In FIG. 1, the blockchain network 101 can be a network having a set of network nodes 103*a-b* (e.g., servers) that are configured to store and manage a blockchain 105, including the generation, verification, and addition of new blocks to the blockchain 105. The blockchain 105 can include a set of blocks 107*a-b* with each block 107*a-b* having a block header 109*a-b* and a body 111*a-b* having a set of transaction entries 113*a*-1-*n*, 113*b*-1-*n*. The block header 109*b* of a current block 107*b* can include a reference to a previous block 107*a*, a timestamp that represents a time when the current block 107*b* was generated, and a reference to the set of transaction entries 113*b*-1 to 113*b-n* included in the current block 107*b*. Every block 107*a-b* in the blockchain 105 can be verified by determining the reference values using the associated hashing function. The references included in the blockchain 105 can be hash values generated by applying one or more hashing algorithms to the corresponding data. In one example, the reference to the previous block 107*a* can be a hash value generated by applying a hashing algorithm to the block header 109*a* of the previous block 107*a*. The use of the references reflects the immutability of the blockchain 105, as a change to any transaction entry 113*a*-1-*n*, 113*b*-1-*n* in the blockchain 105 would result in a different reference value, which would result in the block header 109*a-b* of the corresponding block 107*a-b* to be changed, which in turn would result in a difference reference value for that block header 109*a-b*, requiring the block headers of all previous blocks to change. The set of transaction entries 113*a*-1-*n*, 113*b*-1-*n* can be represented by a hash tree. For example, the set of transaction entries 113*a*-1-*n*, 113*b*-1-*n* can be represented by a Merkle tree. A Merkle tree is a hash-based tree structure with each leaf node being a hash of a block 107*a-b*, and each non-leaf node being a hash of the children of each block 107*a-b*. Merkle trees can have a branching factor of two with each node having up to two children.

Each transaction entry 113*a*-1-*n*, 113*b*-1-*n* may represent a cryptographic digital asset 115 of a certain container 151 that includes a code 117 associated with the container identifier 153. Further, each cryptographic digital asset 115 can include a code 119 that represents an electronic payment instrument. The blockchain 105 can include security methods such as the use of public-key cryptography, which may also be referred to as asymmetric key cryptography or encryption. Public-key cryptography uses pairs of mathematically-related keys (i.e., one public key and one private key) to authenticate messages. The private key can be kept secret and can be used to decrypt data. The public key can be shared and can be used to authenticate or encrypt the data. Further, a private key is like a password that enables access to the corresponding cryptographic digital asset or the means to otherwise interact with the various capabilities that the blockchain 105 can support. In one example, each identifier code 117, 119 can include a cryptographic token and a public or private key. Each cryptographic digital asset 115 can be transferred to a digital wallet of another user with the container identifier code 117 being sent to a blockchain node 103*a-c* of the blockchain 105 and recorded on a new block to confirm the transfer of that cryptographic digital asset 115. In addition, each transfer of a cryptographic digital asset 115 to a digital wallet of a user may include sending an electronic message (e.g., email, text message) to the user with a unique key and a hashed address to the cryptographic digital asset 115. A skilled artisan will readily recognize that any type of information can be stored in a transaction entry of a block and that data so stored may be stored in publicly readable form or in encrypted form depending on the use in which that particular blockchain is intended. While in one embodiment, the container identifier or the electronic payment instrument may be encrypted, in another embodiment, the container identifier or the electronic payment instrument may be provided in publicly available form depending on the use in which the blockchain is intended.

The payment processing network node 131 can be associated with a financial institution (e.g., bank, credit card company) or similar entity and can be operable to process and manage transaction accounts used to send or receive funds associated with an electronic payment transaction. The payment processing node 131 can receive and process electronic payment transactions using traditional methods and systems, which may include obtaining authorization of the electronic payment transactions. Further, the payment processing node 131 can return authorization responses indicating to the POS device 121 the authorization.

In operation during checkout of one or more retail items, the POS device 121 can output, for display on the user interface device 125, 126 (e.g., touch screen display), a visual representation associated with selection of a payment transaction. In response, the POS device 121 can receive, from the user interface device 125, 126, an indication of a touch gesture detected at or about the visual representation associated with the selection of the payment transaction. Further, the POS device 121 can obtain a transaction amount of a payment transaction associated with checkout of one or more items by the POS device 121 and can output, for display on the user interface device 125, 126, a visual representation of that transaction amount. The POS device 121 can output, for display on the user interface device 125, 126, a visual representation associated with selection of various payment methods including a payment method associated with the container identifier 153 of the container 151. In response, the POS device 121 can receive, from the user interface device 125, 126, an indication of a touch gesture detected at or about the visual representation associated with the selection of the payment method associated with the container identifier 153 of the container 151. The POS device 121 can then output, for display on the user interface device 125, 126, a visual representation associated with a request to position the container 151 on or about the surface of the weight scale 123 so that the container identifier 153 can be sensed from the container 151, as represented by reference 161.

The POS device 121 can receive, from the sensing device 127*a*-*b*, an indication of the sensed container identifier. In one example, the container identifier 153 is a QR code or a barcode displayed on an outer surface of the container and the sensing device 127*a*-*b* (e.g., optical scanner, bar code scanner, camera,) is operable to capture the QR code or the barcode displayed on the container 151. In another example, the container identifier 153 is a passive or active RFID tag disposed with the container and the sensing device 127*a*-*b* is an RFID detector device operable to sense the RFID device. In yet another example, the container identifier 153 is an NFC device and the sensing device 127*a*-*b* is an NFC device that is operable to communicate with the container identifier NFC device. The POS device 121 can obtain the container identifier 153 based on the sensed container identifier.

In FIG. 1, the POS device 121 can obtain a reference to the crypto digital asset 115 stored in the blockchain 105 based on the container identifier 153. The POS device 121 can also output, for display on the user interface device 125, 126, a visual representation associated with the successful detection of the container identifier 153 from the container 151. The POS device 121 can send, to a blockchain network node 130*a*-*c* over the network 141, an indication 163 that includes a request for block data associated with the cryptographic digital asset 115 based on the container identifier 153 sensed from the container 151 during checkout of items by the POS device 121. The request indication 163 can include the reference to the cryptographic digital asset 115. In one example, the container identifier 153 is the blockchain address of the cryptographic digital asset 115 stored in the blockchain 105. In another example, the POS device 121 obtains the blockchain address of the cryptographic digital asset 115 from a look-up table based on the container identifier 153. The blockchain network node 130*a*-*c* can receive the block data request indication 163, can obtain the block data request and the corresponding blockchain reference from the request indication 163, and can validate the block data request based on the corresponding blockchain reference. Further, the blockchain network node 130*a*-*c* can obtain the block data 165 associated with the crypto digital asset 115 from the blockchain 105 based on the corresponding blockchain reference and can then send, to the POS device 121 over the network 141, the block data 165 associated with the cryptographic digital asset 115. The block data 165 can include the container identifier code 117 or the payment instrument identifier code 119.

In the current embodiment, the POS device 121 can receive the block data 165 associated with the cryptographic digital asset 115 and can obtain, based on the received block data 165, the electronic payment instrument identifier code 119. The POS system 121 can obtain the electronic payment instrument identifier based on the electronic payment instrument identifier code 119 and a corresponding public key or a private key. In one example, the public key or the private key may be included in a digital wallet account associated with the cryptographic digital asset 115. Further, the POS system 121 can obtain an electronic payment instrument based on the electronic payment instrument identifier. In one example, the electronic payment instrument identifier is associated with a cryptocurrency wallet account. In another example, the electronic payment instrument identifier is associated with a credit or debit card represented in a digital wallet account. The electronic payment instrument can be any type of electronic payment instrument issued to an individual for use in conveying payment information to the POS device 121. In the system 100, an issuing institution server can issue a transaction account to a customer for use in funding electronic payment transactions such as by sending an issued electronic payment instrument to a customer's network node (e.g., smartphone) having a digital wallet application program. The electronic payment instrument can include payment credentials associated with the corresponding transaction account, as well as information associated with the payment instrument identifier code 119 stored on the blockchain 105. In one example, the payment instrument identifier code 119 includes the blockchain address of the cryptographic digital asset 115. In another example, the electronic payment instrument 167 can include a public key that corresponds to a private key of the key pair, with the POS device 121 being operable to verify that the electronic payment instrument 167 corresponds to the electronic payment instrument identifier 153.

In addition, the POS system 121 can send, to the payment processing network node 131 over the network 141, an indication 167 that includes electronic payment instrument information and the transaction amount so that the payment processing network node 131 is operable to process the electronic payment transaction based on the electronic payment instrument information and the transaction amount. In response, the POS system 121 can receive, from the payment processing network node 131 over the network 141, an indication that includes a notification that the electronic payment transaction was processed.

In another embodiment, a transaction entry 113*a*-1-*n*, 113*b*-1-*n* for a cryptographic digital asset 115 recorded in the blockchain 105 can include the container identifier code 117 and a currency amount associated with a successful transaction completed using the payment instrument represented by the payment instrument code 119 so that the blockchain 105 can record how much currency is attributable to the container identifier code 117 of the recorded cryptographic digital asset 115.

Figure 2A:
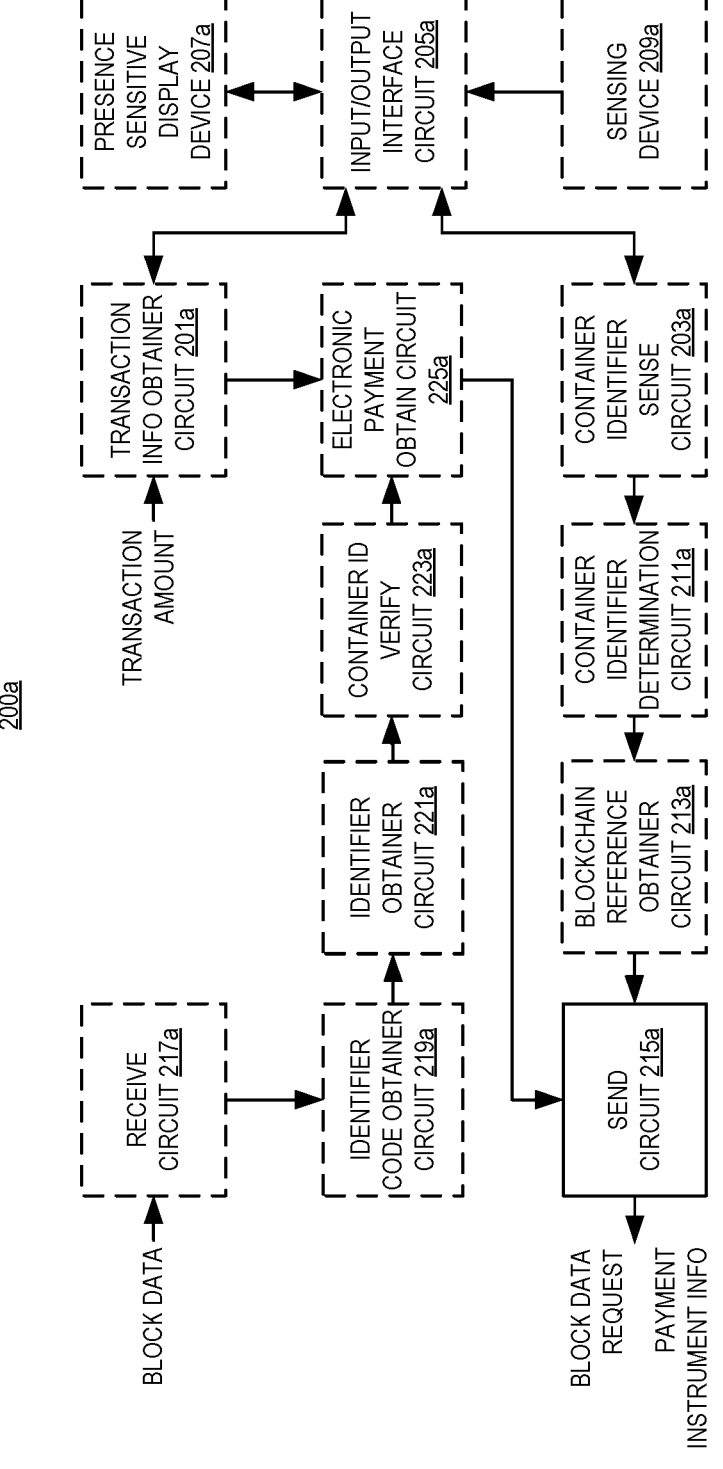
FIG. 2A illustrates one embodiment of a POS device in accordance with various aspects as described herein.

FIG. 2A illustrates one embodiment of a POS device 200*a* in accordance with various aspects as described herein. In FIG. 2A, the device 200*a* implements various functional means, units, or modules (e.g., via the processing circuitry 301*a* in FIG. 3A, via the processing circuitry 501 in FIG. 5, via software code, or the like), or circuits. In one embodiment, these functional means, units, modules, or circuits (e.g., for implementing the method(s) described herein) may include for instance: a transaction information obtainer circuit 201*a* operable to obtain a transaction amount of an electronic payment transaction associated with checkout of one or more items by the POS device 200*a*; a container identifier sense circuit 203*a* operable to sense, from the sensing device 209*a*, the container identifier disposed with the container; an input/output interface circuit 205*a* operable to provide a communication interface to input or output devices such as a presence sensitive display device 207*a* and the sensing device 209*a*; a container identifier determination circuit 211*a* operable to determine a container identifier based on the sensed container identifier; a blockchain reference obtainer circuit 213*a* operable to obtain a blockchain reference to the cryptographic digital asset stored in the blockchain based on the container identifier; a send circuit 215*a* operable to send, to a network node of a blockchain network, an indication that includes a request for block data associated with the cryptographic digital asset based on the blockchain reference and to send, to the payment processing network node, the payment instrument information and the transaction amount so that the payment processing network node is operable to process the electronic payment transaction based on the payment instrument information and the transaction amount; a receive circuit 217a operable to receive, from a network node of the blockchain network, the block data associated with the cryptographic digital asset that includes the container identifier code and the electronic payment instrument identifier code and operable to receive, from the payment processing network node, an indication that includes a notification that the electronic payment transaction was processed; an identifier code obtain circuit 219a operable to obtain, based on the received block data, the container identifier code and the electronic payment instrument identifier code based on the received block data; an identifier obtain circuit 221a operable to obtain the container identifier and the electronic payment instrument identifier based on the corresponding identifier code and a public key or a private key associated with the corresponding identifier code; a container identifier verification circuit 223a operable to verify that the container identifier code corresponds to the sensed container identifier disposed with the container; and an electronic payment information obtain circuit 225a operable to obtain electronic payment instrument information based on the electronic payment instrument identifier.

Figure 2B:
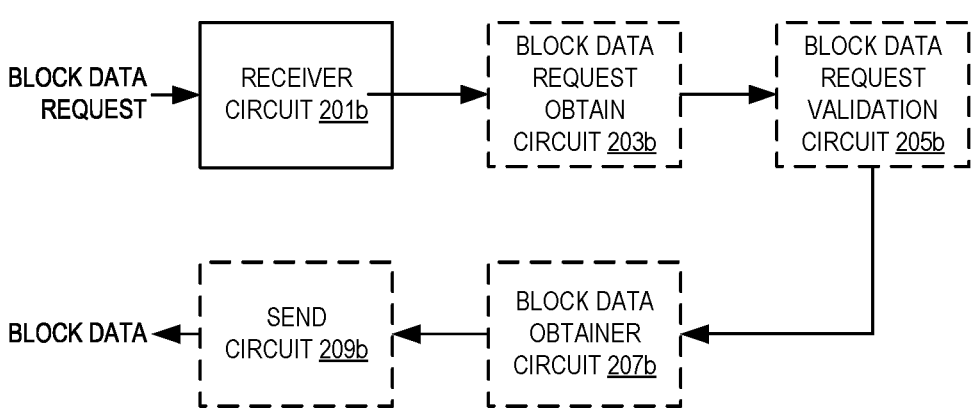
FIG. 2B illustrates one embodiment of a network node of a blockchain network in accordance with various aspects as described herein.

FIG. 2B illustrates one embodiment of a network node device 200b in accordance with various aspects as described herein. In FIG. 2B, the device 200b implements various functional means, units, or modules (e.g., via the processing circuitry 301b in FIG. 3B, via software code, or the like), or circuits. In one embodiment, these functional means, units, modules, or circuits (e.g., for implementing the method(s) herein) may include for instance: a receiver circuit 201b operable to receive, from the POS system, an indication that includes a request for block data associated with the cryptographic digital asset, with the request indication having the cryptographic digital asset reference; a block data request determination circuit 203b operable to obtain the block data request and the corresponding blockchain reference from the request indication; a block data request validation circuit 205b operable to validate the block data request based on the cryptographic digital asset reference; a block data obtainer circuit 207b operable to obtain the block data associated with the cryptographic digital asset based on the cryptographic digital asset reference; and a send circuit 209b operable to send, to the POS device, an indication that includes the requested block data associated with the cryptographic digital asset.

FIG. 3A illustrates another embodiment of a POS device 300a in accordance with various aspects as described herein. In FIG. 3A, the device 300a may include processing circuitry 301a that is operably coupled to one or more of the following: memory 303a and network communications circuitry 305a, the like, or any combination thereof. The network communication circuitry 305a is configured to transmit and/or receive information to and/or from one or more other network node devices via any communication technology. The processing circuitry 301a is configured to perform processing described herein, such as by executing instructions stored in memory 303a. The processing circuitry 301a in this regard may implement certain functional means, units, or modules.

FIG. 3B illustrates another embodiment of a network node device 300b in accordance with various aspects as described herein. In FIG. 3B, the device 300b may include processing circuitry 301b that is operably coupled to one or more of the following: memory 303b and network communications circuitry 305b, the like, or any combination thereof. The network communication circuitry 305b is configured to transmit and/or receive information to and/or from one or more other network node devices via any communication technology. The processing circuitry 301b is configured to perform processing described herein, such as by executing instructions stored in memory 303b. The processing circuitry 301b in this regard may implement certain functional means, units, or modules.

FIG. 4A illustrates one embodiment of a method 400a performed by the POS system 121, 200a, 300a, 500 of conducting a payment transaction via a blockchain registered container at point of sale in accordance with various aspects as described herein. In FIG. 4A, the method 400a may start, for instance, at block 401a where it may include obtaining, by the POS system 121, 200a, 300a, 500, a transaction amount of an electronic payment transaction associated with checkout of one or more items by the POS system 121, 200a, 300a, 500. At block 403a, the method 400a may include outputting, for display on a presence sensitive display of the POS system 121, 200a, 300a, 500, a visual representation associated with selection of various payment methods including payment via the container identifier of the container. The method 400a may include receiving, from the presence sensitive display, an indication of a touch gesture detected at or about the visual representation associated with the selection of the payment method via the container identifier of the container, as represented by block 405a. At block 407a, the method 400a may include outputting, for display on the presence sensitive display, a visual representation associated with a request to position the container on or about the surface of the weight scale so that the container identifier can be sensed from the container. At block 409a, the method 400a includes receiving, from the sensing device, a sensed container identifier disposed with the container. The method 400a may include determining the container identifier value based on the sensed container identifier, as represented by block 411a.

FIG. 4B illustrates another embodiment of a method 400b performed by the POS system 121, 200a, 300a, 500 of conducting a payment transaction via a blockchain registered container at point of sale in accordance with various aspects as described herein. In FIG. 4B, the method 400b may start, for instance, at block 401b where it may include obtaining a reference to the cryptographic digital asset stored in the blockchain based on the container identifier value. At block 403b, the method 400b includes sending, to a network node of the blockchain network, an indication that includes a request for block data associated with the cryptographic digital asset based on the cryptographic digital asset request, with the request indication including the cryptographic digital asset reference. At block 405b, the method 400b may include receiving, from the network node of the blockchain network, the block data associated with the cryptographic digital asset. At block 407b, the method 400b may include obtaining, based on the received block data, the electronic payment instrument identifier code based on the received block data. At block 409b, the method 400b may include obtaining, based on the electronic payment instrument identifier code, the electronic payment instrument identifier and a public key or a private key associated with the electronic payment instrument identifier code. The method 400b may include obtaining electronic payment instrument information based on the electronic payment instrument identifier, as represented by block 411b. At block 413b, the method 400b may include sending, to the payment processing network node, the payment instrument information and the transaction amount so that the payment processing network node is operable to process the electronic payment transaction based on the payment instrument information and the transaction amount. In response, the method 400*b* may include receiving, by the POS system, from the payment processing network node, an indication that includes a notification that the electronic payment transaction was processed, as represented by block 415*b*.

FIG. 4C illustrates one embodiment of a method 400*c* performed by a network node 103*a-c*, 200*b*, 300*b* of a blockchain network of conducting a payment transaction via a blockchain registered container at point of sale in accordance with various aspects as described herein. In FIG. 4C, the method 400*c* may start, for instance, at block 401*c* where it includes receiving, from the POS system, an indication that includes the request for block data associated with the cryptographic digital asset, with the request indication having the cryptographic digital asset reference. The method 400*c* can include obtaining the block data request and the corresponding blockchain reference from the request indication, as represented by block 403*c*. At block 405*c*, the method 400*c* may include validating the block data request based on the cryptographic digital asset reference. At block 407*c*, the method 400*c* may include obtaining the block data associated with the cryptographic digital asset based on the cryptographic digital asset reference. At block 409*c*, the method 400*c* includes sending, to the POS system, an indication that includes the requested block data associated with the cryptographic digital asset based on the container identifier sensed from the container during checkout of one or more items by the POS system.

FIG. 5 illustrates another embodiment of a POS device 500 in accordance with various aspects as described herein. In FIG. 5, device 500 includes processing circuitry 501 that is operatively coupled to input/output interface 505, neural network circuit 509, network connection interface 511, power source 513, memory 515 including random access memory (RAM) 517, read-only memory (ROM) 519 and storage medium 521, communication subsystem 531, and/or any other component, or any combination thereof.

The input/output interface 505 may be configured to provide a communication interface to an input device, output device, or input and output device. The device 500 may be configured to use an output device via input/output interface 505. An output device may use the same type of interface port as an input device. For example, a USB port or a Bluetooth port may be used to provide input to and output from the device 500. The output device may be a speaker, a sound card, a video card, a display, a monitor, a printer, an actuator, an emitter, a smartcard, another output device, or any combination thereof. The device 500 may be configured to use an input device via input/output interface 505 to allow a user to capture information into the device 500. The input device may include a touch-sensitive or presence-sensitive display, an optical sensor, (e.g., a digital camera, a digital video camera, a web camera, a scanner, etc.), a scanner, a weight scale, a microphone, a sensor, a mouse, a trackball, a directional pad, a trackpad, a scroll wheel, a smartcard, and the like. In one example, the input device may be a combined scale and scanner. The scale can be operable to weigh one or more items placed on a transparent window associated with the combined scale and scanner. The scanner can be operable to scan an identifier (e.g., barcode, Q/R code, RF ID) disposed with a scanned item. The presence-sensitive display may include a capacitive or resistive touch sensor to sense input from a user. As shown in FIG. 5, the input/output interface 505 can be configured to provide a communication interface to various input/output components such as a scanners or sensors 561, a display device 563, a payment processing mechanism 565, a printer 567, a coupon slot mechanism 569, a cash acceptor mechanism 571, a light emitting device 573, the like, or any combination thereof. A sensor may be, for instance, an accelerometer, a gyroscope, an RFID detector device, an NFC detector device, a tilt sensor, a force sensor, a magnetometer, an optical or image sensor, an infrared sensor, a proximity sensor, another like sensor, or any combination thereof.

In FIG. 5, storage medium 521 may include operating system 523, application program 525, data 527, resolution data 529, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the neural network circuit 509 may be configured to learn to perform tasks by considering examples such as performing object detection of certain objects in an image. In one example, a first neural network circuit is configured to perform object detection of persons in an image. For example, the neural network circuit 509 may use image data to detect the number of people in a self-checkout queue. In FIG. 5, the network connection interface 511 may be configured to provide a communication interface to network 543*a*. The network 543*a* may encompass wired and/or wireless networks such as a local-area network (LAN), a wide-area network (WAN), a computer network, a wireless network, a telecommunications network, another like network or any combination thereof. For example, network 543*a* may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, web application, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500*a-b* to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543*b* using the communication subsystem 531. The network 543*a* and the network 543*b* may be the same network or networks or different network or networks. The communication subsystem 531 may be configured to include one or more transceivers used to communicate with the network 543*b*. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543*b* may encompass wired and/or wireless networks such as a local-area network (LAN), a wide-area network (WAN), a computer network, a wireless network, a telecommunications network, another like network or any combination thereof. For example, the network 543*b* may be a cellular network, a Wi-Fi network, and/or a near-field network. The power source 513 may be configured to provide alternating current (AC) or direct current (DC) power to components of the device 500*a-b*.

The features, benefits and/or functions described herein may be implemented in one of the components of the device 500 or partitioned across multiple components of the device 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by a POS system having a sensing device operable to sense an identifier specific to and disposed with a container configured to transport one or more items associated with checkout of those items by the POS system. Further, the POS system is communicatively coupled to a blockchain network that includes network nodes that are collectively configured to operate a blockchain having blocks. Each block includes a header and a body having one or more transaction entries. The header includes a reference to a previous block in the blockchain and a reference to the transaction entries of the current block in the blockchain. The container identifier is specific to a cryptographic digital asset stored on the blockchain as a code that represents the container identifier. Further, the cryptographic digital asset includes a code that represents an identifier that is specific to an electronic payment instrument configured to enable an electronic payment transaction based on the container identifier sensed from the container. In addition, the container identifier code and the electronic payment instrument identifier code are included in a transaction entry of a block in the blockchain that is associated with the cryptographic digital asset. The method includes sending, to a network node of the blockchain network, an indication that includes a request for block data associated with the cryptographic digital asset based on the container identifier sensed from the container during checkout of one or more items by the POS system so that the electronic payment instrument can be obtained to enable an electronic payment transaction associated with the checkout of the one or more items by the POS system.

In another exemplary embodiment, the method further includes obtaining a transaction amount of an electronic payment transaction associated with the checkout of the one or more items by the POS system.

In another exemplary embodiment, the method further includes outputting, for display, a visual representation associated with a request to position the container on or about the surface of the weight scale so that the container identifier can be sensed from the container.

In another exemplary embodiment, the method further includes receiving, by the POS system, from the sensing device, the container identifier disposed with the container.

In another exemplary embodiment, the method further includes obtaining a reference to the cryptographic digital asset stored in the blockchain based on the container identifier. Further, the request indication includes the cryptographic digital asset reference.

In another exemplary embodiment, the method further includes receiving, by the POS system, from the network node of the blockchain network, the block data associated with the cryptographic digital asset responsive to the sending of the block data request indication.

In another exemplary embodiment, the method further includes obtaining, based on the received block data, the electronic payment instrument identifier code based on the received block data.

In another exemplary embodiment, the method further includes obtaining the electronic payment instrument identifier based on the electronic payment instrument identifier code and a public key or a private key associated with the electronic payment instrument identifier code.

In another exemplary embodiment, the method further includes obtaining electronic payment instrument information based on the electronic payment instrument identifier.

In another exemplary embodiment, the method further includes sending, by the POS system, to the payment processing network node, the payment instrument information and the transaction amount so that the payment processing network node is operable to process the electronic payment transaction based on the payment instrument information and the transaction amount.

In another exemplary embodiment, the method further includes receiving, by the POS system, from the payment processing network node, an indication that includes a notification that the electronic payment transaction was processed.

In another exemplary embodiment, the container identifier code includes a cryptographic token and a public key. Further, a private key associated with the container identifier code is issued to a cryptocurrency wallet account associated with the cryptographic digital asset.

In another exemplary embodiment, the electronic payment instrument identifier code includes a cryptographic token and a public key. Further, a private key associated with the electronic payment instrument identifier code is issued to a cryptocurrency wallet account associated with the electronic payment instrument.

In another exemplary embodiment, a digital wallet of another network node includes a representation of the cryptographic digital asset.

In another exemplary embodiment, a cryptocurrency wallet of another network node includes a representation of the electronic payment instrument.

In another exemplary embodiment, the container is a reusable shopping bag composed of a non-plastic material.

In another exemplary embodiment, a quick response (QR) code disposed on the outside surface of the container represents the container identifier.

In one exemplary embodiment, a POS system includes a sensing device operable to sense an identifier specific to and disposed with a container configured to transport one or more items associated with checkout of those items by the POS system. Further, the POS system is communicatively coupled to a blockchain network that includes network nodes that are collectively configured to operate a blockchain having blocks. Each block has a header and a body with one or more transaction entries. Also, the header has a reference to a previous block in the blockchain and a reference to the transaction entries of the current block in the blockchain. The container identifier is specific to a cryptographic digital asset stored on the blockchain as a code that represents the container identifier. Further, the cryptographic digital asset includes a code that represents an identifier that is specific to an electronic payment instrument configured to enable an electronic payment transaction based on the container identifier sensed from the container. In addition, the container identifier code and the electronic payment instrument identifier code is included in a transaction entry of a block in the blockchain that is associated with the cryptographic digital asset. The POS system further including processing circuitry and a memory, with the memory containing instructions executable by the processing circuitry whereby the processing circuitry is configured to send, to a network node of the blockchain network, an indication that includes a request for block data associated with the cryptographic digital asset based on the container identifier sensed from the container during checkout of one or more items by the POS system so that the electronic payment instrument can be obtained to enable an electronic payment transaction associated with the checkout of the one or more items by the POS system.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method, comprising:

by a point of sale (POS) device having a sensing device operable to sense an identifier specific to and disposed with a reusable container configured to transport one or more items associated with checkout of those items by the POS device, the POS device being communicatively coupled to a blockchain network that includes network nodes that are collectively configured to operate a blockchain having blocks, with each block having a header and a body with one or more transaction entries, with the header having a reference to a previous block in the blockchain and a reference to the transaction entries of the current block in the blockchain, the reference to the previous block includes a hash value of the previous block and the reference to the transaction entries includes a hash tree representation corresponding to the transaction entries, the container identifier being specific to a cryptographic digital asset stored on the blockchain as a code that represents the container identifier, the cryptographic digital asset also including a code that represents an identifier that is specific to an electronic payment instrument configured to enable an electronic payment transaction based on the container identifier sensed from the container, wherein the code that represents the identifier that is specific to the electronic payment instrument corresponds to a second code that represents the electronic payment instrument identifier, with at least one of the container identifier code and the electronic payment instrument identifier code being stored in encrypted form in a transaction entry of a block in the blockchain that is associated with the cryptographic digital asset, sensing, by the sensing device, the container identifier specific to and disposed with the container;

determining the blockchain reference to the cryptographic digital asset based on the sensed container identifier, wherein the cryptographic digital asset includes a first code that represents the container identifier and the second code that represents the electronic payment instrument identifier;

sending, by the POS device, to a network node of the blockchain network, a first indication that includes a request for a block data associated with the cryptographic digital asset, wherein the request includes the blockchain reference;

receiving, by the POS device, from the network node over the network, a second indication that includes the block data associated with the cryptographic digital asset;

verifying, by the POS device, cryptographic integrity of the received block data by determining a first hash value corresponding to the reference to the previous block and determining a hash tree representation corresponding to the transaction entries, and confirming the first hash value and the hash tree representation match the reference to the previous block and the reference to the transaction entries in the header included in the received block data;

obtaining the first code that represents the container identifier and the second code that represents the electronic payment instrument identifier based on the received block data;

verifying ownership of the container based on the first code that represents the container identifier and the sensed container identifier;

obtaining a payment instrument information based on the second code that represents the electronic payment instrument identifier and a corresponding public key or private key;

sending, by the POS device, to a payment processing network node, the payment instrument information and a transaction amount and receiving, from the payment processing network node, an indication that the electronic payment transaction was processed; and enabling completion of the electronic payment transaction for the one or more items based on the payment instrument information and the indication that the electronic payment transaction was processed.

2. The method of claim 1, further comprising:
obtaining a transaction amount of an electronic payment transaction associated with the checkout of the one or more items by the POS device.

3. The method of claim 2, further comprising:
outputting, for display, a visual representation associated with a request to position the container on or about the surface of a weight scale so that the container identifier can be sensed from the container.

4. The method of claim 3, further comprising:
receiving, by the POS device, from the sensing device, the container identifier disposed with the container.

5. The method of claim 4, further comprising:
obtaining a blockchain reference to the cryptographic digital asset stored in the blockchain based on the container identifier; and
wherein the first indication includes the blockchain reference.

6. The method of claim 1, further comprising:
receiving, by the POS device, from the network node of the blockchain network, the block data associated with the cryptographic digital asset responsive to the sending of the first indication.

7. The method of claim 6, further comprising:
obtaining, based on the received block data, the electronic payment instrument identifier code.

8. The method of claim 1, further comprising:
obtaining the electronic payment instrument identifier based on the electronic payment instrument identifier code and a public key or a private key associated with the electronic payment instrument identifier code.

9. The method of claim 1, further comprising:
obtaining electronic payment instrument information based on the electronic payment instrument identifier.

10. The method of claim 7, further comprising:
sending, by the POS device, to a payment processing network node, the payment instrument information and the transaction amount so that the payment processing network node is operable to process the electronic payment transaction based on the payment instrument information and the transaction amount.

11. The method of claim 10, further comprising:
receiving, by the POS device, from the payment processing network node, an indication that includes a notification that the electronic payment transaction was processed.

12. The method of claim 1, wherein the container identifier code includes a cryptographic token and a public key, with a private key associated with the container identifier code being issued to a cryptocurrency wallet account associated with the cryptographic digital asset.

13. The method of claim 1, wherein the electronic payment instrument identifier code includes a cryptographic token and a public key, with a private key associated with the electronic payment instrument identifier code being issued to a cryptocurrency wallet account associated with the electronic payment instrument.

14. The method of claim 1, wherein a digital wallet of another network node includes a representation of the cryptographic digital asset.

15. The method of claim 1, wherein the electronic payment instrument identifier is associated with a cryptocurrency wallet account.

16. The method of claim 1, wherein the container is a reusable shopping bag composed of a non-plastic material.

17. The method of claim 1, wherein a quick response (QR) code disposed on the outside surface of the container represents the container identifier.

18. A point of sale (POS) device, comprising:
with the POS device having a sensing device operable to sense an identifier specific to and disposed with a reusable container configured to transport one or more items associated with checkout of those items by the POS device, the POS device being communicatively coupled to a blockchain network that includes network nodes that are collectively configured to operate a blockchain having blocks, with each block having a header and a body with one or more transaction entries, with the header having a reference to a previous block in the blockchain and a reference to the transaction entries of the current block in the blockchain, the reference to the previous block includes a hash value of the previous block and the reference to the transaction entries includes a hash tree representation corresponding to the transaction entries, the container identifier being specific to a cryptographic digital asset stored on the blockchain as a code that represents the container identifier, the cryptographic digital asset also including a code that represents an identifier that is specific to an electronic payment instrument configured to enable an electronic payment transaction based on the container identifier sensed from the container, wherein the code that represents the identifier that is specific to the electronic payment instrument corresponds to a second code that represents the electronic payment instrument identifier, with at least one of the container identifier code and the electronic payment instrument identifier code being stored in encrypted form in a transaction entry of a block in the blockchain that is associated with the cryptographic digital asset,
wherein the POS device further comprises processing circuitry and a memory, the memory containing instructions executable by the processing circuitry whereby the processing circuitry is configured to:
sense, by the sensing device, the container identifier specific to and disposed with the container;

determine the blockchain reference to the cryptographic digital asset based on the sensed container identifier, wherein the cryptographic digital asset includes a first code that represents the container identifier and the second code that represents the electronic payment instrument identifier;

send, to a network node of the blockchain network, a first indication that includes a request for a block data associated with the cryptographic digital asset, wherein the request includes the blockchain reference;

receive, from the network node over the network, a second indication that includes the block data associated with the cryptographic digital asset;

verify cryptographic integrity of the received block data by determining a first hash value corresponding to the reference to the previous block and determining a hash tree representation corresponding to the transaction entries, and confirming the first hash value and the hash tree representation match the reference to the previous block and the reference to the transaction entries in the header included in the received block data;

obtain the first code that represents the container identifier and the second code that represents the electronic payment instrument identifier based on the received block data;

verify ownership of the container based on the first code that represents the container identifier and the sensed container identifier;

obtain a payment instrument information based on the second code that represents the electronic payment instrument identifier and a corresponding public key or private key;

send, to a payment processing network node, the payment instrument information and a transaction amount and receive, from the payment processing network node, an indication that the electronic payment transaction was processed; and enable completion of the electronic payment transaction for the one or more items based on the payment instrument information and the indication that the electronic payment transaction was processed.

19. The POS device of claim 18, wherein the memory includes further instructions executable by the processing circuitry whereby the processing circuitry is configured to:

output, for display, a visual representation associated with a request to position the container on or about the surface of a weight scale so that the container identifier can be sensed from the container and in response, receive, from the sensing device, an indication of the container identifier disposed with the container; and obtain a blockchain reference to the cryptographic digital asset stored in the blockchain based on the container identifier, with the first indication including the blockchain reference.

20. The POS device of claim 18, wherein the memory includes further instructions executable by the processing circuitry whereby the processing circuitry is configured to:

obtain the electronic payment instrument identifier based on the second code and a public key or a private key associated with the electronic payment instrument identifier code;

obtain the electronic payment instrument information based on the electronic payment instrument identifier; and send, to a payment processing network node, the payment instrument information and the transaction amount so that the payment processing network node is operable to process the electronic payment transaction based on the payment instrument information and the transaction amount.

21. The method of claim 1, wherein the POS device is configured to complete the electronic payment transaction without requiring user input of payment credentials and without requiring presentation of a physical payment card or mobile payment device.

* * * * *